Sept. 25, 1923.
C. PARENT
TRACTION DEVICE
Filed Nov. 14, 1922
1,469,105
2 Sheets-Sheet 1
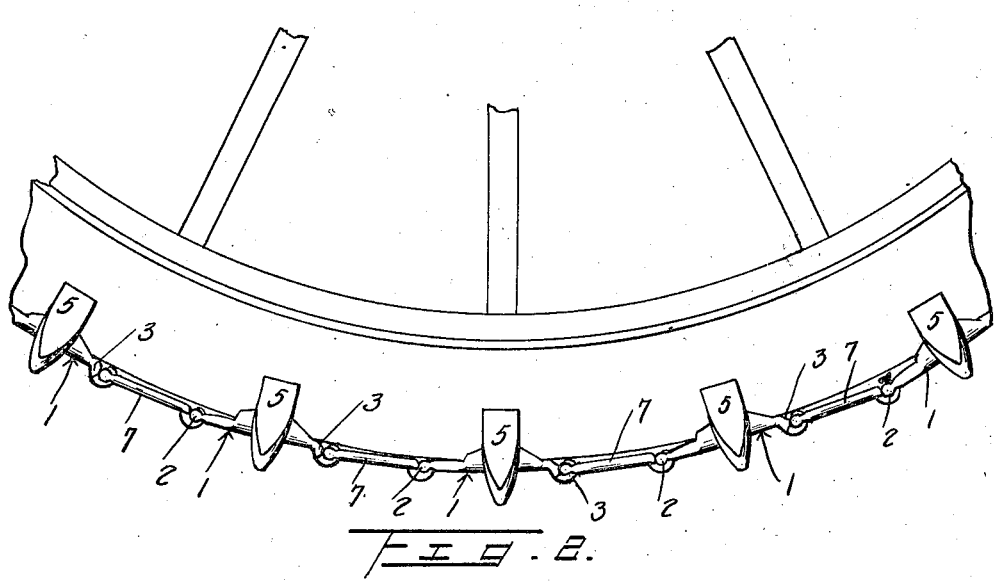
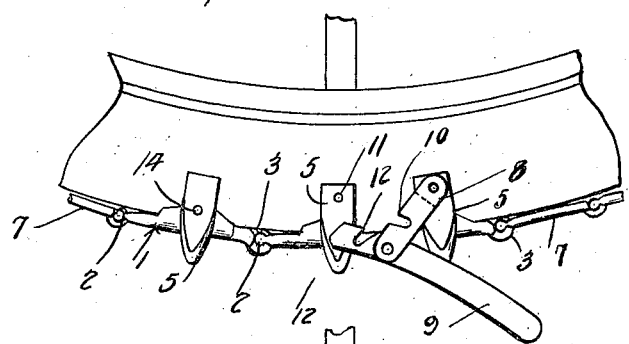
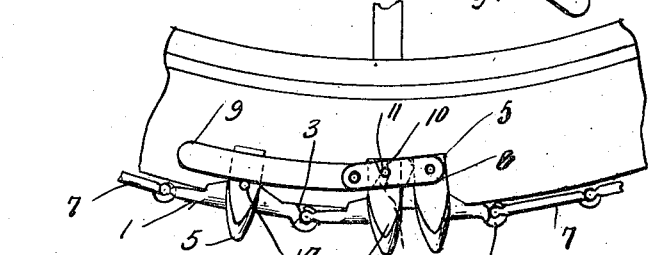
Inventor
C. Parent.

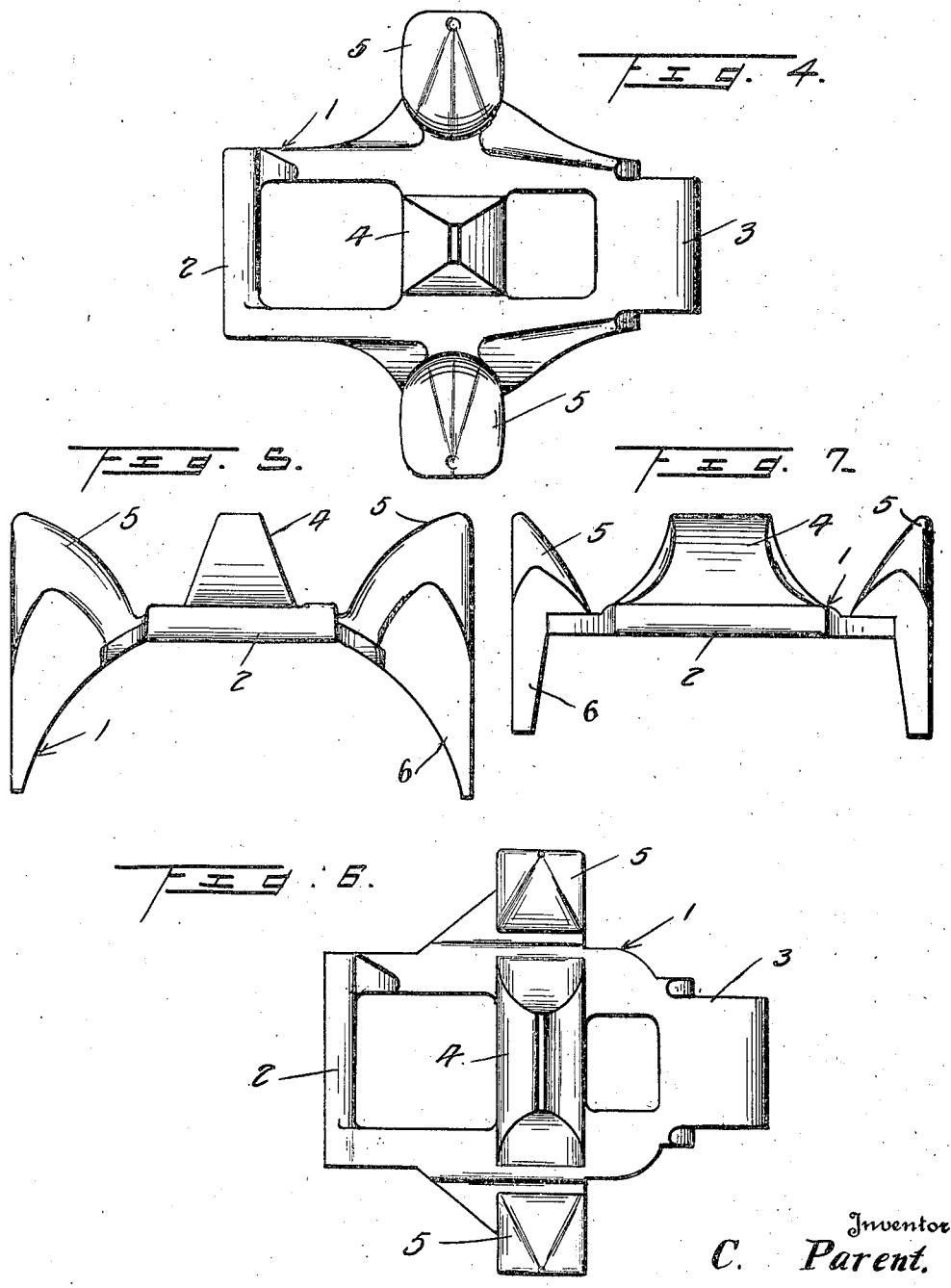

Patented Sept. 25, 1923.

1,469,105

UNITED STATES PATENT OFFICE.

CHARLES PARENT, OF DENVER, COLORADO.

TRACTION DEVICE.

Application filed November 14, 1922. Serial No. 600,892.

*To all whom it may concern:*

Be it known that I, CHARLES PARENT, a citizen of the United States, residing at Denver, in the county of Denver and State of Colorado, have invented certain new and useful Improvements in Traction Devices; and I do hereby declare the following to be a full, clear, and exact description of the invention, such as will enable others skilled in the art to which it appertains to make and use the same.

The invention has relation to means for increasing the tractive force of propelling means and to guard against skidding and in its specific adaptation provides a device which may be readily applied to a drive wheel of an automobile or motor vehicle whereby the same is adapted to pull itself out of a rut, depression or soft place in the road, or propel itself over yielding and sandy surfaces, and which at the same time will guard against skidding on wet and slippery surfaces. In constructing the device, the same is adapted both for pneumatic and solid tires.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a fragmentary view in elevation showing the application of the invention, Figure 2 is a detail view showing more particularly the fastening means which are in open position, Figure 3 is a view similar to Figure 2 showing the fastening means in closed position, Figure 4 is a top plan view of the form of device designed for pneumatic tires, Figure 5 is an end view thereof, Figure 6 is a top plan view of the form of device provided for solid tires, and Figure 7 is an end view thereof.

Corresponding and like parts are referred to in the following description and designated in the several views of the drawings by like reference characters.

In either form of the device, the same comprises an elongated link 1 having a crossbar 2 at one end and a hook 3 at the opposite end. A lug or tooth 4 is provided intermediate the ends of the link and projects outwardly therefrom and is approximate of pyramidal form. Other lugs or teeth 5 are disposed at the sides of the link in transverse alinement with the lug or tooth 4 and are approximately of conoidal form. The outer ends of the lugs or teeth 4 and 5 are substantially in the same straight line so as to engage with the surface of the road whereby to increase the tractive force of the tire to which the device is attached. The side lugs or teeth 5 are provided with inwardly extending projections 6 forming guards which are adapted to engage opposite sides of the tire and prevent lateral displacement of the device when in position. In the preferable construction, the device consists of a single casting or forging. In the form of device designed more particularly for pneumatic tires, the inner or rear side of the lugs or teeth 4 and 5 is curved to conform to the transverse curvature of the tire, as shown most clearly in Figure 5. In the form designed for solid tires which are straight across, the inner or rear side of the lugs or teeth 4 and 5 is straight, as shown most clearly in Figure 7.

In practice, a plurality of traction links embodying the invention are connected by plain links 7 to form a chain of sufficient length to encompass the tire of a wheel of an automobile or other motor vehicle and the ends of such chain are connected by coupling links 8 and lock levers 9. A coupling link 8 is pivoted at one end to each side of a terminal link of the chain and a lock lever 9 is pivoted intermediate its ends to the outer or free end of the coupling link 8. A notch 10 is formed in the inner edge of each of the links 8 and is adapted to engage a lateral stud 11 of the other terminal link of the chain. A notch 12 is formed in the outer edge of the inner end of the lock lever 9 and is adapted to engage the stud 11 whereby to draw the two ends of the chain together. When the chain is made secure, the stud 11 is confined within the notches 10 and 12 of the parts 8 and 9 and the outer end of the lever 9 is engaged under a stop 14 which is somewhat similar to the stud 11. In order that the ends of the chain may be drawn together, the terminal links have the ends beyond the lugs cut away. The links 8 are pivoted to the side lugs 5 of a terminal link, and the side lugs 5 of the other terminal link receive the studs 11. Thus the end links of the chain may be drawn close together, as indicated in Figure 3.

What is claimed is:

A traction device comprising an elongated link having a crossbar at one end and a hook at the opposite end, and having a centrally disposed lug intermediate its ends, and other lugs at its sides in transverse alinement with the central lug, the outer ends of the lugs being substantially in the same straight line and the side lugs having inner projections forming guards to engage opposite sides of the tire.

In testimony whereof I affix my signature in presence of two witnesses.

CHARLES PARENT.

Witnesses:
B. J. LORD,
Mrs. MARY LEACH.